United States Patent [19]
Bertorelli

[11] 3,837,877
[45] Sept. 24, 1974

[54] PRODUCTION OF ROD-SHAPED MICRO-CRYSTALLITES FROM CLAY

[75] Inventor: Orlando Leonard Bertorelli, Havre de Grace, Md.

[73] Assignee: J. M. Huber Corporation, Locust, N.J.

[22] Filed: Jan. 10, 1973

[21] Appl. No.: 322,602

Related U.S. Application Data

[63] Continuation-in-part of Ser. No. 141,180, May 7, 1971, abandoned.

[52] U.S. Cl. .............................. 106/288 B, 423/328
[51] Int. Cl. .......................... C08h 17/04, C09c 1/28
[58] Field of Search .................... 106/288 B, 72, 73; 423/328

[56] References Cited
UNITED STATES PATENTS
3,037,843   6/1962   Mason............................ 106/288 B

*Primary Examiner*—James E. Poer
*Attorney, Agent, or Firm*—Harold H. Flanders; Donald S. Lilly

[57] ABSTRACT

A method for preparing unique rod-shaped micro-crystalline particulates from kaolin clay is disclosed. The method involves the hydrothermal treatment of an aqueous dispersion of kaolin clay and a hydroxide of an alkali metal which transforms the clay into alumino-silicate rod-shaped micro-crystallites. The product has particular utility as reinforcing agents for non-elastomer type plastics. By controlling the process variables a product having predetermined characteristics and/or properties can be obtained.

4 Claims, 5 Drawing Figures

1μ

PRODUCTION OF ROD-SHAPED MICRO-CRYSTALLITES FROM CLAY

RELATION TO COPENDING APPLICATION

The present application is a continuation in-part of U.S. Ser. No. 141,180 filed May 7, 1971, now abandoned.

BACKGROUND OF THE INVENTION

1. Field of the Invention

This invention relates to inorganic pigments, and, more particularly, to a process for manufacturing rod-shaped micro-crystallites by the hydrothermal treatment of kaolin clay with alkali metal hydroxides.

2. Description of the Prior Art

As known in the art, inorganic pigments have for some time been used in many and ever increasing application. For example, kaolin clay is widely used as a pigment in the paper coating industry, as a filler pigment for rubber, as extenders or fillers in paints, etc. To a large extent, interest in the production of pigment from kaolin clays or the like, has been restricted to processes that produce finely divided spherically shaped particles. In general this property i.e., spherical shaped particles, is considered a first requisite for the use of such pigments in the above noted applications, e.g., reinforcing agents for rubber compounds and extenders for paints.

In more recent years, prior art workers have also directed their attention to the development of non-spherical or fibrous particles, particularly as reinforcing agents for plastics. In this regard, a number of techniques have been developed for producing crystalline fibers, usually referred to in the art as "whiskers," from various materials including metal oxides, such as titanium dioxide and alumina, high purity silica, nitrides, various carbon compounds and the like. Examples of such procedures or techniques are disclosed in U.S. Pat. No. 3,409,395 to Shyne et al, U.S. Pat. No. 3,147,085 to Gatti and U.S. Pat. No. 3,398,013 to Krochmal et al.

While a number of such proposals have been made and have achieved commercial acceptance, in general they suffer from two serious disadvantages. The first is the high cost of the raw material itself, i.e., the metallic oxides, nitrides, carbides, high purity silica, etc. The second involves the complex nature of the processes required to produce the fibrous pigment or whiskers. The present invention is directed to an unique process, and product thereof, that overcomes the aforementioned disadvantages.

SUMMARY OF THE INVENTION

In summary, the present invention provides a highly efficient and simplified process for preparing rod-shaped or elongated particles from kaolin clay. While the unique product of the invention may be used in many applications, it has been found to have particular utility as a reinforcing pigment for non-elastomeric type plastics. The invention is based on the unexpected discovery that the hydrothermal treatment of kaolin clay with the alkali hydroxides of the metals of Group Ia of the Periodic Table effects the transformation of the kaolin clay into novel alumino-silicate rod-shaped micro-crystallites. Broadly speaking, in accordance with the method of the invention, an aqueous suspension or dispersion of an alkali metal hydroxide and a kaolin clay, having a certain critical mol ratio as will be discussed below, is subjected to hydrothermal treatment at superatmospheric pressures and high temperatures for a period to convert the kaolin clay from an amorphous material to a crystalline rod-shaped particulate. Thus the present invention provides a simplified process for producing a relatively low cost crystalline product that may be used in lieu of the so-called whiskers in the reinforcement of plastics as well as in other applications.

It is accordingly a general object of this invention to provide a novel rod-shaped micro-crystalline alkali metal aluminum silicate product and a unique process for preparing same.

Another more particular object is to provide a highly efficient and economical method for preparing elongated particuleates by the hydrothermal treatment of kaolin clay.

Yet another object is to provide a novel alumino silicate rod-shaped particulate from kaolin clay which has particular utility as a reinforcing pigment for non-elastomer type plastics.

Still another object is to provide an economical method for producing rod-shaped particles from kaolin clay, said method not subject to the disadvantages and complexities involved in prior known techniques.

BRIEF DESCRIPTION OF THE DRAWINGS

The manner in which the foregoing and other objects are achieved in accordance with the present invention will be better understood in view of the following detailed description and accompanying drawings, which form a part of the specification, and wherein.

DESCRIPTION OF PREFERRED EMBODIMENT(S)

Figure 1:
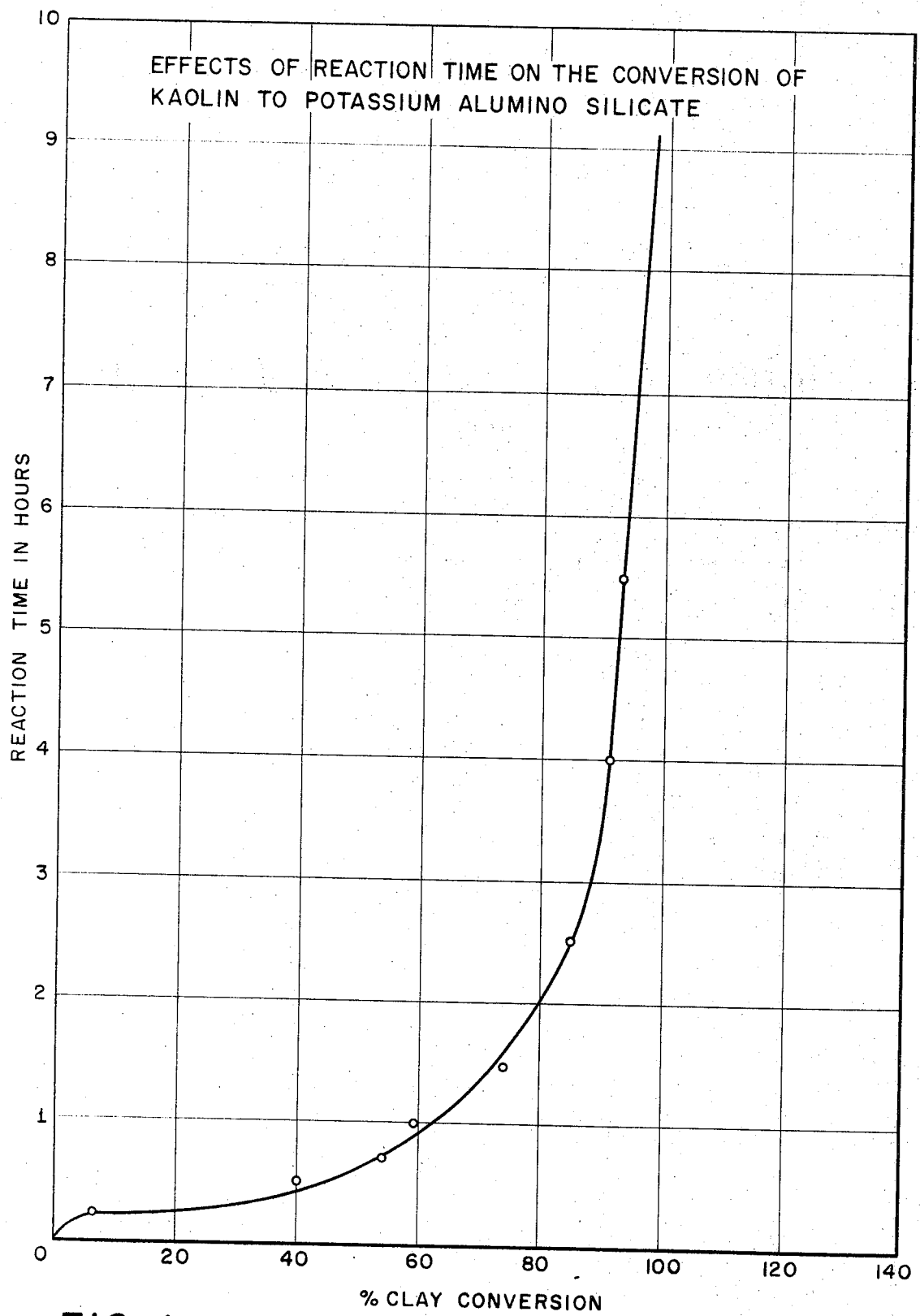
FIG. 1 is a graph which shows the effect of the reaction time for the conversion of kaolin clay to potassium alumino silicate micro-crystallites.

As discussed above, the present invention is based on the discovery and embodies the concept that non-spherical rod-shaped micro-crystallites can be produced by the hydrothermal treatment of kaolin clay with the hydroxides of the alkali metals of Group Ia of the Periodic Table. These include sodium, potassium, lithium, rubidium, cesium and francium hydroxide. In its broadest aspects, the method of the invention comprises forming an aqueous dispersion of kaolin clay and an alkali metal hydroxide and thereafter subjecting the dispersion to hydrothermal treatment at superatmospheric pressures at high temperatures and for a period to effect substantial reaction between the reactive components. In this manner, and that upon which the instant invention is based, the kaolin clay is converted into a micro-crystalline metallic alumino-silicate having a substantially rod or bar-shaped structure. The latter characteristic or property, i.e., the elongated rod or bar-shaped structure, distinguishes the product of the invention from other natural or synthetic products, such as sodalite (if NaOH is employed as the hydroxide), which are complex materials of varying crystalline structures.

In this regard and as is known in the art, kaolin clay is a hydrous aluminum silicate which may be represented by the empirical formula:

As used herein the term "kaolin clay" includes those clays which contain the mineral kaolinite as a principal constituent, as well as those containing nacrite, dickite and anauxite. In accordance with the invention and unexpectedly, the alkali metal hydroxides react with the kaolin clay hydrothermally to destroy its typically plate-like structure and to effect transformation of the clay into elongated rod-type micro-crystallites. While not intending to be bound by any particular theory, it is believed that in following the method of the invention the alkali hydroxides first form alkali silicates and alkali aluminates which immediately react to form alkali alumino silicates and free alkali hydroxide. The latter reacts to form additional intermediate reactants, this cycling continuing until all the alkali is used up.

In general the overall reaction involved may be summarized as follows:

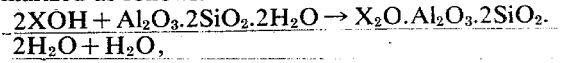

wherein X is an alkali metal selected from group Ia of the Periodic Table.

Turning now to more specific details of the invention, it has been found that the quantity of the alkali metal hydroxide employed is critical to the extent that the micro-crystallites are formed. That is, the formation of crystalline rod-shaped particles versus the non-crystalline amorphous material is a function of the molar ratio of the reactants. Thus it has been discovered that in order to produce rod-shaped particles by the hydrothermal reaction of kaolin clay and alkali metal hydroxides, it is necessary that the molar ratio of the alkali hydroxide to clay must be 2:1. Less than this ratio will destroy the kaolin platelet particles but will not form the rod-shaped complex. Consequently, according to the invention, the hydrothermal treatment of the kaolin clay with the alkali hydroxide is carried out in an aqueous dispersion containing two moles of alkali hydroxide per mole of clay.

In addition to the concentration of the reactants, and broadly speaking for the moment, the growth and size of the micro-crystallites as well as the percent conversion of the kaolin clay is a function of the reaction temperature and the reaction time. Considering the method of the invention in more detail, the hydrothermal treatment of the dispersion of the clay and hydroxide is preferably conducted at temperatures in the range of about 150°C. to 280°C., with particularly advantageous results being obtained at temperatures between 180°C. to 225°C. While the optimum reaction temperatures will vary slightly depending upon the particular hydroxide employed, the above discussed temperature ranges are required to obtain adequate growth of the micro-crystallites.

While the reaction time is a function of the temperature employed, to obtain a conversion of the clay greater than about 60 to 80 percent, a reaction time of at least 1 hour is required for the indicated temperature range, i.e., 150°C to 280°C. In this regard, FIG. 1 is a graph which shows the effect of the reaction time versus the percent conversion for kaolin clay and potassium hydroxide. From FIG. 1 it will be seen that with the reaction temperature being maintained relatively constant (201°C. – 208°C.) the percent clay conversion rises from about 40 percent, after 30 minutes, to about 80percent at the end of a 2 hour period. At this point, the curve rises sharply, it requiring an additional two to seven hours to obtain a clay conversion on the order of 90–98 percent. Experimentation has established that the slope of the curves for other alkali metal hydroxides are similar to that illustrated in FIG. 1 to the extent, e.g., that when employing temperatures in the range of from about 150°C to 280°C., it requires an approximate two hour reaction period to obtain clay conversions greater than about 70–80 percent.

From the above, and as will be readily appreciated by those skilled in the art, it will be seen that the reaction or process of the invention may be selectively directed or controlled to produce a product of predetermined characteristics. Thus, and as will be discussed in more detail in the Examples, once the characteristics of a product (such as the ratio of the length to the cross-sectional area) have been selected one may control the process variables to produce the particular product desired. For example if the reaction time is critical from a practical or economical standpoint (as may be the case in a continuous process), one may increase the reaction temperature. In any event, the ability to selectively control the nature or characteristics of the product is a remarkable aspect of the invention.

In practicing the method of the invention, the hydrothermal treatment of the aqueous dispersion of kaolin clay and alkali metal hydroxide is effected in a closed vessel at temperatures above the boiling point of the aqueous suspension being treated and under the elevated pressures obtained at such temperatures. The pressures obtained at temperatures in the range of 150°C –280°C are 54 to 938 psig. As known in the art, the hydrothermal treatment of clays or like pigments may be effected, for example, by the use of high pressure steam in the jacket of a reactor or by the direct introduction of steam into a closed vessel or reactor, etc. Any suitable pressurized equipment provided with means for maintaining the aqueous dispersion under high agitation and/or provided with means for controlling the introduction of the pressurized steam, etc. may be employed. Examples of such techniques are disclosed in U.S. Pat. No. 3,033,648 to Linden and U.S. Pat. No. 3,115,391 to Leineweber.

In treating clays hydrothermally, the clay is employed in the form of an aqueous slip or slurry. In general and with regard to the present invention, the concentration of the clay slurry is not critical and may vary widely. Thus the percent solids may vary from about 10 to 50 percent. Clay slurries less concentrated than 10 percent are not recommended for practical reasons whereas slurries more concentrated than 50 percent by weight solids are difficult to pump and are also not recommended. Preferable slurry concentrations, for the above discussed temperature ranges, are about 15–40 percent by weight solids. If the anhydrous form of the alkali metal hydroxide is not employed, the amount of the water present in the alkali hydroxide solutions should be considered when preparing a slurry of a given solids content.

As previously noted, clays which are suitable for the invention are those which contain, as a principal constituent, the mineral kaolinite. Naturally occuring or raw kaolin clay, which has been refined to remove grit and undispersible agglomerates, may be used. However it has been found to be particularly advantageous to employ finely divided, high grade kaolin clay which has been refined to the extent that it consists precominantly of the mineral kaolinite. A particularly advantageous refined kaolin clay that may be used in the present invention is "HI-WHITE" which is a hydrous-aluminum silicate having an average particle size of 62–68 percent less than two microns. However, other refined kaolin clays may be employed.

The invention will be further illustrated by the following examples which set forth particularly advantageous embodiments. While the examples serve to illustrate the invention they are not intended to limit it thereto.

EXAMPLE 1

Two moles of lithium hydroxide $Li(OH).H_2O$ of 99.6 percent purity (83.9 g.) were dissolved in 1,400 mls. of distilled water in a 2 liter Parr pressure reactor. One mole (258 g.) of "HI-WHITE" clay was slurried into the lithium hydroxide solution until well dispersed. The concentration of the resulting slurry was approximately 19 percent by weight solids. The reactor was sealed and heated while under strong agitation at 225° C for approximately 2½ hours. At the end of this reaction period the slurry was cooled to room temperature, removed from the reactor and filtered. The filter cake was washed with distilled water to remove free lithium hydroxide and was then dried.

The yield from the reaction was found to be 220.2 grams; wet-cake moisture was 45.20, with a GE brightness of 81.9. The percent conversion of the kaolin to $Li_2O.Al_2O_3.2SiO_2$ was about 85 percent. Electron photomicrograpsh disclosed that the product was non-spherical micro-crystallites of rod or bar-shaped particles.

EXAMPLE 2

Figure 2:
FIG. 2 is a print of an electron photomicrograph for a product of the invention produced by the reaction of lithium hydroxide and kaolin clay.

The above procedure was repeated except that the reaction was maintained for a 5 hour period. The yield from this reaction was found to be 283.5 g., 96.8 percent of the kaolin being converted to the lithium complex. The latter figure is close to the purity of the "HI-WHITE" clay based on the kaolinite content (95.5 percent). FIG. 2 is a photomicrograph of the reaction product obtained in this Example.

EXAMPLE 3

The procedures of Example 1 and 2 were repeated except that 2 gram moles of sodium hydroxide (Runs No. 3 and 8), potassium hydroxide (Runs No. 4 and 9), rubidium hydroxide (Runs No. 5 and 10) & cesium hydroxide (Run No. 6 and 11) were substituted for the lithium hydroxide. The reaction product for each test consisted of micro-crystalline rod-shaped particulates. The percent conversion at 225°C for 2½ hours was greater than 75 percent (Run No. 3–6). The percent conversion for the 5 hour reaction period was greater than 90percent (Runs 8–11).

EXAMPLE 4

Figure 3:
FIGS. 3, 4 and 5 are further electron photomicrographs for products prepared by the reaction of potassium hydroxide and clay and at varying reaction times and amounts of the hydroxide.
Figure 4:

A series of further test runs were conducted following the general procedures of Examples 1–3 except that one-eighth and one-half of the theoretical amounts for each hydroxide was used, i.e., ¼ gram moles and 1 gram mole of hydroxide per gram mole of clay, respectively. The results established that the kaolin platelet particules were destroyed to some extent. However, the rod-shaped complexes were not formed. Examples of the results of these tests are shown in FIGS. 3 and 4. The photomicrographs of FIGS. 3 and 4 are the reaction products of potassium hydroxide and kaolin, as indicated.

Figure 5:

As established by FIGS. 2 and 5, the unique micro-crystalline alkali alumino silicates of the present invention are rod-shaped particulates. Specific properties thereof include: Specific gravities of about 2.1 to 2.5; pack densities of about 15 lbs/cu.ft. to 25–30 lbs/cu.ft.; oil absorption values in the range of from 50–60 cc/100 g.; G.E. brightness values of from about 80–90 and surface areas of about 10 to 15 m 2/g.

As is evident from the above disclosure, the present invention provides a unique product and process for producing pigments that may be used in many applications.

As should readily be appreciated by those skilled in the art, the products of the invention comprise rod-shaped micro-crystallites which, as such, are distinguishable over synthetic or naturally occuring materials such as the above noted, sodalite, etc. Thus e.g., the elongated product is different from the hydroxy-sodalite intermediate referred to in U.S. Pat. No. 3,307,843. While the precise theory of the invention is not completely understood, the mole ratio of the hydroxide to the clay (i.e., 2:1) as employed in the present invention is critical and produces rod-shaped particulates as compared to the said intermediate produced by U.S. Pat. No. 3,307,843 wherein mole ratios (hydroxide to clay) of from 2.5 to 25.0:1 are employed.

What is claimed is:

1. An improved process for producing rod-shaped micro-crystallites having predetermined characteristics or properties and particular use as a reinforcing pigment for non-elastomeric type plastics, said process comprising the steps of: forming an aqueous dispersion of kaolin clay and lithium hydroxide, said clay comprising particles predominately of the mineral kaolinite, at least 50 percent of said particles being less than 2 microns; the molar ratio of said lithium hydroxide and kaolin clay in said dispersion being 2:1; subjecting said dispersion to hydrothermal treatment at superatmospheric pressures and a temperature in the range of from about 150° to 280°C and maintaining said pressures and temperatures for a period in the range of from about 1 to 10 hours to effect reaction between the reactive components and to transform said kaolin clay into elongated rod-shaped micro-crystallites.

2. An improved process for producing rod-shaped micro-crystallites having predetermined characteristics or properties and particular use as a reinforcing pigment for non-elastomeric type plastics, said process comprising the steps of: forming an aqueous dispersion of kaolin clay and potassium hydroxide, said clay comprising particles predominately of the mineral kaolinite, at least 50 percent of said particles being less than 2 microns; the molar ratio of said potassium hydroxide and kaolin clay in said dispersion being 2:1; subjecting said dispersion to hydrothermal treatment at superatmospheric pressures and a temperature in the range of from about 150°to 280°C and maintaining said pressures and temperatures for a period in the range of from about 1 to 10 hours to effect reaction between the reactive components and to transform said kaolin clay into elongated rod-shaped micro-crystallites.

3. An improved process for producing rod-shaped micro-crystallites having predetermined characteristics or properties and particular use as a reinforcing pigment for non-elastomeric type plastics, said process comprising the steps of: forming an aqueous dispersion of kaolin clay and sodium hydroxide, said clay comprising particles predominately of the mineral kaolinite, at least 50 percent of said particles being less than 2 microns; the molar ratio of said sodium hydroxide and kaolin clay in said dispersion being 2:1, subjecting said dispersion to hydrothermal treatment at superatmospheric pressures and a temperature in the range of from about 150° to 280°C and maintaining said pressures and temperatures for a period in the range of from about 1 to 10 hours to effect reaction between the reactive components and to transform said kaolin clay into elongated rod-shaped micro-crystallites.

4. A micro-crystalline alumino-silicate of the formula:

$X_2O.Al_2O_3.2SiO_2.2H_2O$, wherein X is an alkali metal selected from the group consisting of lithium and potassium, said aluminosilicate comprising rod-shaped micro-crystallites having a specific gravity of about 2.1 to 2.5; an oil absorption in the range of from 50–60 cc/100g; a G.E. brightness value of about 80 to 90 and a surface area of about 10 to 15 $m^2/g$.

* * * * *